Jan. 30, 1951  B. R. CARSON ET AL  2,539,656
PHONOGRAPH
Original Filed July 28, 1939  9 Sheets-Sheet 1

Fig. 1.

Inventors
BENJAMIN R. CARSON
& KNUT J. MAGNUSSON
By C. D. Tuska
Attorney

Jan. 30, 1951          B. R. CARSON ET AL          2,539,656
                            PHONOGRAPH
Original Filed July 28, 1939                    9 Sheets-Sheet 3

Fig. 3.

Inventors
BENJAMIN R. CARSON
& KNUT J. MAGNUSSON
By
Attorney

Jan. 30, 1951    B. R. CARSON ET AL    2,539,656
PHONOGRAPH
Original Filed July 28, 1939    9 Sheets-Sheet 5

Fig. 5.

Inventors
BENJAMIN R. CARSON
& KNUT J. MAGNUSSON
By
CD Puska
Attorney

Patented Jan. 30, 1951

2,539,656

UNITED STATES PATENT OFFICE 2,539,656

PHONOGRAPH

Benjamin R. Carson, Haddonfield, and Knut J. Magnusson, Princeton, N. J., assignors to Radio Corporation of America, a corporation of Delaware Original application July 28, 1939, Serial No. 286,988. Divided and this application February 21, 1945, Serial No. 579,000

2 Claims. (Cl. 274—10)

This invention relates to phonographs, and more particularly to an automatic phonograph of the type wherein a plurality of records are supported above the turntable to be successively lowered onto the turntable for playing, the present invention being an improvement upon that disclosed and claimed in the Carson patent, No. 2,280,685, granted on April 21, 1942, and the present application being a division of our copending application Serial No. 286,988, filed July 28, 1939, now Patent Number 2,412,441, issued December 10, 1946.

In the aforesaid patent, there is disclosed an automatic phonograph of the type mentioned above wherein records of only one size can be played automatically. To play records of a larger size, it is necessary to make certain adjustments of the apparatus, and even then, the larger records can only be played manually.

The primary object of our present invention is to provide an improved phonograph of the type specified which may be operated automatically to reproduce a plurality of records of either small diameter, or of large diameter, or of mixed diameters arranged at random in the stack, the machine to play the entire stack of records without interruption and without attention on the part of the user after having once been set into operation.

More particularly, it is an object of our present invention to provide an improved automatic phonograph as aforesaid which will incorporate means for effecting the release and transfer of each successive lowermost record of the stack to the turntable regardless of the diameter of the record.

Another object of our present invention is to provide an improved phonograph as aforesaid, which, when arranged to play records of mixed diameters indiscriminately, will operate to accurately locate the sound reproducing instrumentality at the starting point of each new record regardless of its diameter.

It is also an object of our present invention to provide an improved phonograph as aforesaid which will insure the transfer of only one record at a time from the stack to the turntable regardless of variations in thickness of the records of the stack.

Another object of our present invention is to provide an improved automatic phonograph as aforesaid which will handle warped records without any difficulty.

A further object of our present invention is to provide an improved phonograph of the type described which is very compact, extremely accurate and efficient in operation, which comprises a minimum number of parts, and which is relatively inexpensive to manufacture.

In accordance with our present invention, we provide a pair of rotatable record supporting posts at diametrically opposite points relative to the turntable, the posts extending upwardly from a suitable supporting plate and being spaced apart a distance sufficient to accommodate 12" records. The records are supported in a vertically extending stack upon shelves extending toward each other from the posts a distance sufficient to accommodate 10" records. Thus, regardless of whether the lowermost record is a 10" record or a 12" record, the shelves will be able to support the entire stack.

Overlying the supporting shelves on each of the posts are record separating members also carried by the posts and provided with knife edges which are adapted to enter between the lowermost record of the stack and the next highest one as the posts are rotated. These separating members support the remaining records of the stack while the lowermost one is permitted to drop onto the turntable after the posts have rotated through an angle sufficient to enable the record supporting shelves to clear the lowermost record.

It is well known that 12" records are somewhat thicker than 10" records, and also that records of a given diameter are not absolutely uniform in thickness. Accordingly, it is necessary to make the record separating members adjustable so that they can be accommodated to records of different thicknesses while the posts rotate. This is accomplished, according to our invention, by making the record separating members adjustable toward and away from the supporting shelves and by controlling the adjustment in two ways. In the first adjustment, should the knife edges of the separators strike the edge of a record, the posts will, as they begin to rotate at the proper point in the automatic cycle, effect a slight camming action on the record separators to raise them slightly with respect to the record supporting shelves until the knife edges on the separators have reached the plane of contact between the two lowermost records, whereupon the knife edges are free to be wedged in between the records and thus separate them. The other adjustment is accomplished by means extending through the record supporting shelves which are engaged by 12" records but not by 10" records, the engagement of the last named means by the larger records serving to effect a substantial raising of the separator members relative to the shelves sufficient to accommodate the knives on the separators to the plane between the lowermost 12" record and the record next above it.

To insure properly locating the sound reproducing instrumentality at the beginning of each record lowered onto the turntable, there is provided a control lever or post which is pivotally mounted adjacent to one of the aforesaid record supporting posts. The needle locating mechanism is normally arranged to cause the sound reproducing instrumentality to land in the 10" starting position, but is under control of the aforesaid pivoted lever. Normally, this lever is in a position such that it is clear of the edge of a 10" record as the record drops down onto the turntable. However, the lever has a cam thereon which lies in the path of movement of a 12" record and which is engaged by the edge of the larger record as it drops down onto the turntable. This cams the lever to a position where it controls the return of the sound reproducing instrumentality to the 12" position. In this way, the proper starting point of the needle for each successive record is properly determined. If desired, the mechanism may also be provided with means for presetting the 12" landing position of the needle so that, when only 12" records are played, the aforesaid pivoted lever and the mechanism controlled thereby need not be availed of to insure the proper landing of the needle on the larger records.

The novel features that we consider characteristic of our invention are set forth with particularity in the appended claims. The invention itself, however, both as to its organization and method of operation, together with additional objects and advantages thereof, will best be understood from the following description of a specific embodiment, when read in connection with the accompanying drawings, in which

Referring more particularly to the drawings, wherein similar reference characters designate corresponding parts throughout, we have shown a motor board 1 or the like to which is secured a motor plate 3 carrying a motor 5 which, through a flexible coupling 7, drives a turntable spindle 9 carried by a second plate 11. The coupling 7 is preferably of the type fully disclosed and claimed in the Carson Patent No. 2,247,651, granted July 1, 1941. The spindle 9 supports and drives a horizontally disposed turntable 13 upon which a plurality of records R accumulate in a manner hereinafter more particularly set forth so that each can be reproduced in succession.

Fixed to the spindle 9 is a gear 15 which continuously drives a gear 17, the latter gear acting as a control device for effecting operation of the parts to carry out a cycle of automatic operations, the gear 17 being rotatably mounted on the plate 11 and supporting a cam member 19 on the underside thereof. The cam member 19 is somewhat oval shaped and is provided with a downwardly extending peripheral flange 21 formed with an opening 23 therein for a purpose hereinafter more fully described. Within the space defined by the flange 21 is a cam plate 25 having a portion 25a extending through the opening 23 and being formed to provide a cam track 27 between its periphery and the flange 21. The control cam 19 and its cam plate 25 are fixed relative to each other and are also fixed to the control gear 17 so that they will all rotate in unison and so that the flange 21 and the periphery of the cam plate 25 will function as cams relative to the axis of rotation of the control gear 17.

Pivoted to the plate 11 on a post 29 is an actuating member 31 comprising a lever having four lateral extensions 31a, 31b, 31c and 31d, as well as two oppositely extending arms 31e and 31f. A roller 33 is mounted on the arm 31a for cooperation, as a cam follower, with the cam track 27 whereby the cam member 19 and its cam plate 25 are adapted to impart rotation to the actuating lever 31 about the pivot 29. At the appropriate point in the automatic cycle, the roller 33 is caused to enter into the cam track 27 through the opening 23 to the right of the extension 25a (Fig. 1) and during the first half of the cycle, the cam flange 21 is effective to cause counter-clockwise movement of the actuating lever 31. When, however, the roller 33 has reached the position shown in Fig. 5, the cam plate 25 then takes up the work and the right-hand side of its periphery, as viewed in Fig. 5, acts upon the roller 33 to thereafter return the actuating lever 31 in a clockwise direction to its normal position. The actuating lever 31 is then held in its rest position by means of a coil spring 35 which surrounds a toggle member 37 slotted at its ends. One of the slotted ends of the toggle member 37 is received in a groove on a post 39 which is fixed to the plate 11, and the other end thereof is received in the groove of a second post 41 carried by the arm 31a of the actuating lever, the spring 35 acting between a pair of washers 43 which bear against the posts 39 and 41. When the actuating lever 31 is in its rest position, the posts 39 and 41 lie on a straight line to one side of the pivot point 29 of the actuating lever 31, whereby the spring 35 is effective, as an over-center spring, to insure holding the actuating lever in its normal position. At this time, also, the spring 35 is compressed. During the first half of the record changing cycle (that is, while the actuating lever 31 moves from the position shown in Fig. 1 to the position shown in Fig. 5), the post 41 has moved to a position such that the straight line joining the posts 39 and 41 lies on the other side of the pivot 29, and the spring 35 has gradually expanded to assist moving the actuating lever 31 counter-clockwise. At the same time, it insures contact of the roller 33 with the cam plate 25 during the last half of the cycle because the toggle member 37 is now on a line lying on the other side of the pivot 29. A rubber block 45 fixed to the plate 11 is engaged by the post 41 when the actuating lever 31 has returned to rest position and takes up the shock of the lever 31.

Pivoted to the under side of the plate 11 on a post 47 is a cable lever 49 having an offset portion which receives an eye bolt 51 to which one end of a coil spring 53 is secured. A cable 55, having one end thereof secured to the other end of the spring 53, passes around a guide roller or pulley 57 mounted on a bracket 59 and through an opening in the plate 11, being secured at its other end to a pickup arm or the like support 61 having a sound reproducing instrumentality or sound translating device 63 thereon which carries a reproducing needle 65.

The cable lever 49 is provided with a cam edge 49a which first has a short, rapid rise with respect to the pivot 47 to approximately the point "A" (Fig. 1) and thereafter continues along an arc 50. Upstanding from the lever arm 31a is a pin 67 which, during reproduction of a record, occupies a position spaced from the cam edge 49a, as clearly shown in Fig. 1. As soon, however, as the lever 31 begins its initial counter-clockwise rotation under the influence of means hereinafter described, the pin 67 engages the cam edge 49a and rotates the cable lever 49 in a counterclockwise direction rather rapidly. This first causes the lever 49 to take up the tension in the spring 53 and the slack in the cable 55, and then to exert a pull on the pickup arm 61 to quickly raise the pickup 63 above the played record. By this time, the actuating lever 31 has reached a position such that the arc 50 is concentric with the pivot post 29. Hence, no further counterclockwise movement of the cable lever 49 takes place as long as the pin 67 passes over the arced portion 50 of the cam edge 49a, the pick-up arm 61 being held in raised position all this time.

Figure 4:
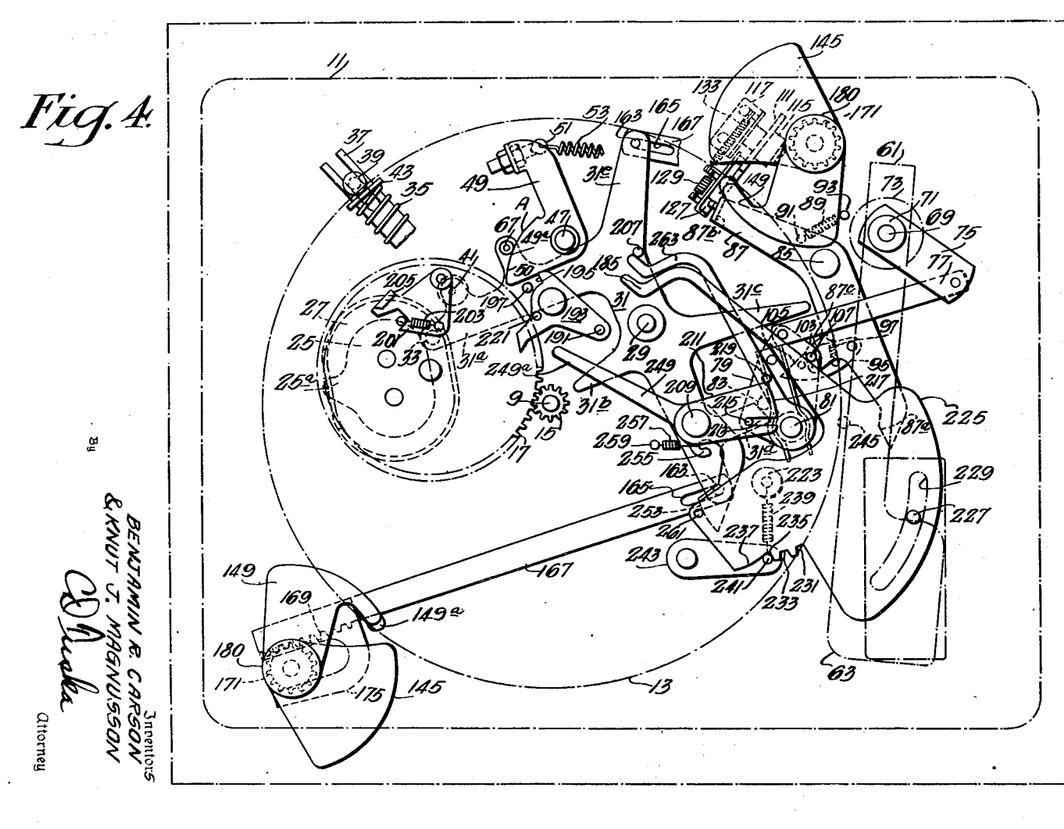
Figure 4 is a similar view showing the position of the parts at the time when a new 10" record is released from the stack to permit it to drop onto the turntable.
Figures 12, 13, 14, 15:
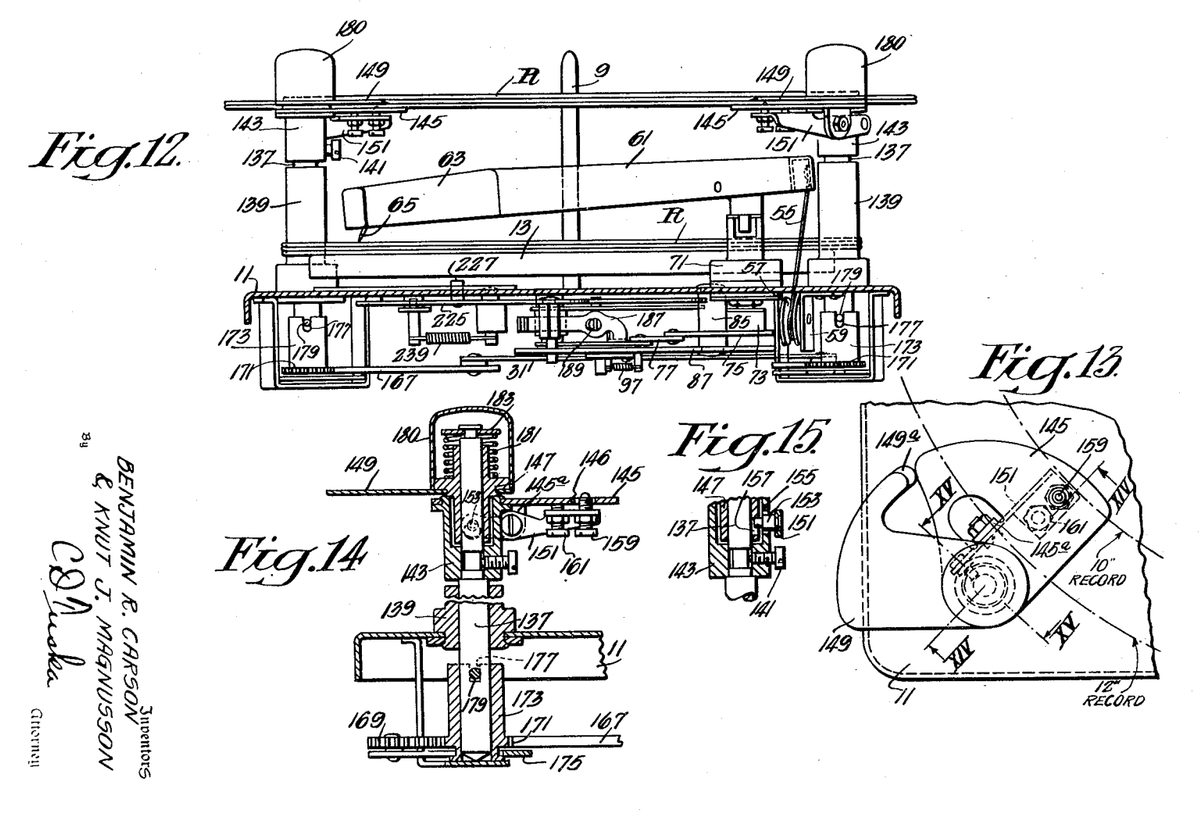
Figure 12 is a sectional view taken on the plane of the line XII—XII in Fig. 1, certain of the parts of Fig. 1 being omitted for the sake of clearness.
Figure 13 is an enlarged plan view of the record supporting post appearing in the lower, left hand corner of Fig. 1 showing, in detail, the record supporting shelf and parts carried thereby.
Figure 14 is a sectional view taken on the line XIV—XIV of Figure 13 and viewed in the direction of the appended arrows.
Figure 15 is a fragmentary sectional view taken on the line XV—XV of Figure 13 and viewed in the direction of the appended arrows.

The pickup arm 61 is pivotally mounted on a supporting post 69 rotatably mounted in a bushing 71 on the plate 11 and extending through the bushing 71 below the plate 11, the bushing 71 and the post 69 being inclined from the vertical about three degrees toward the turntable 13. Secured to the lower end of the post 69 is a collar 73 (see Fig. 12) from which extends an arm 75 connected by means of a link 77 to a plate 79 pivotally mounted on a post 81 which is secured to the plate 11. The plate 79 has a downwardly extending pin 83 thereon which lies in the path of movement of the end of the arm 31d of the actuating lever 31. During the playing portion of a cycle (that is, while a record is being reproduced), the arm 31d of the actuating lever is in the position shown in Fig. 1. However, immediately after the pickup 63 has been raised from the played record, as above described, continued movement of the actuating lever 31 in a counter-clockwise direction under the influence of the cam flange 21 brings the end of the lever arm 31d into engagement with the pin 83 and causes the plate 79 to move clockwise about its pivot post 81. This, in turn, causes the arm 75 to move counter-clockwise by reason of the pivoted link connection 77, whereby the pickup arm 61 is moved counter-clockwise to a position clear of the turntable and the record stack, as shown in Fig. 4, the pickup arm 61 being retained in elevated position all this time by reason of the engagement of the pin 67 with the portion 50 of the cam edge 49a.

Pivotally mounted on a post 85 on the under side of the plate 11 is a pickup arm locating lever 87, the lever 87 being constantly biased in a clockwise direction by means of a coil spring 89 fixed at one end to a pin 91 on the lever 87 and at its other end to a pin 93 on the under side of the plate 11. The purpose of the lever 87 is to determine the starting position of the needle 65 when the pickup arm 61 is subsequently returned and lowered onto the next succeeding record for playing.

Figure 3:
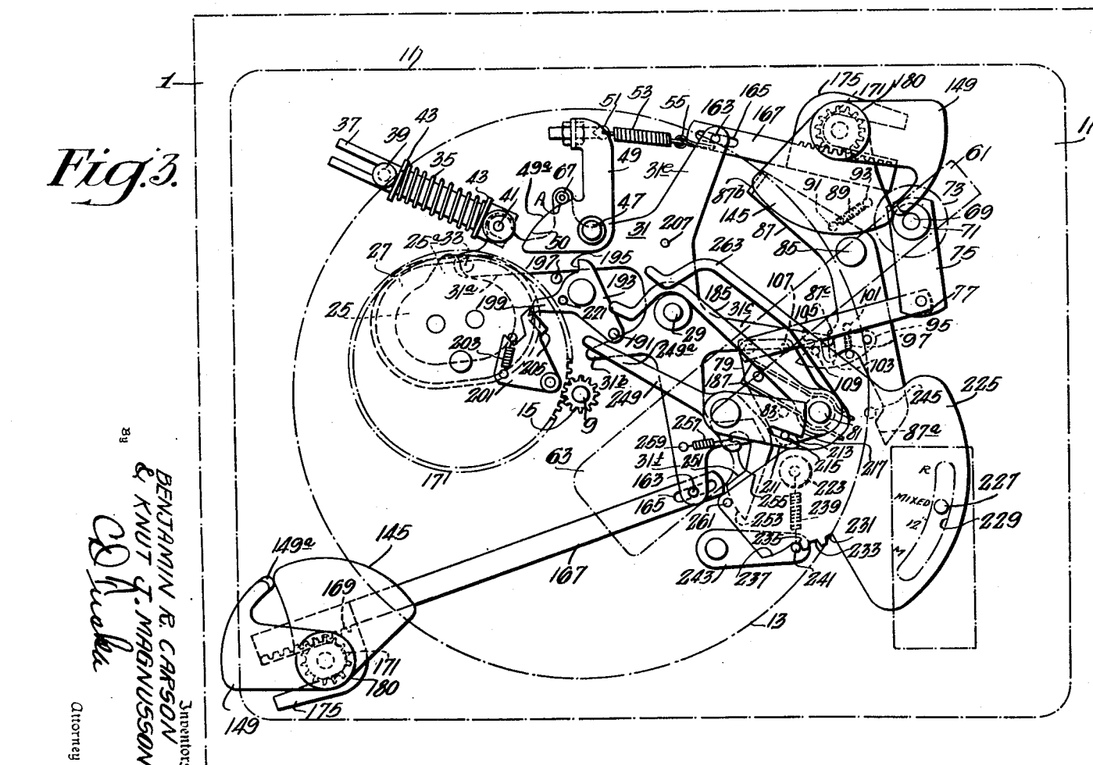
Figure 3 is a view similar to Fig. 1, but showing the position of the parts immediately after the record changing portion of the automatic cycle has been initiated.

Pivotally mounted on the lever 87 is a detent lever 95 which is constantly biased in a clockwise direction relative to the lever 87 by means of a coil spring 97 having one end thereof around a pin 99 on the detent lever 95 and its other end around the pin 101 on the lever 87. The detent lever 95 is provided with a U-shaped notch 103 and an adjacent cam edge 105 (see Figs. 4, 5 and 6) and the notch 103 is so located thereon that, when the detent lever 95 is in the position shown in Fig. 3, the left-hand edge of the notch 103 (as viewed) is spaced from the parallel edge of a toe 87c on the lever 87 a distance sufficient to accommodate a downwardly extending pin 107 on the plate 79. Normally, that is, during playing of a record, the arm 31c of the actuating lever 31 is in engagement with a pin 109 on the detent lever 95 to hold the detent lever in the position shown in Fig. 1. After the needle 65 has entered the record terminal groove and the actuating lever 31 begins its counter-clockwise movement, the arm 31c gradually recedes from the pin 109 and the spring 97 pulls the detent lever into the position shown in Fig. 3, at which time the pin 101 stops further clockwise movement of the detent lever 95 with respect to the lever 87. Upon continued movement of the actuating lever 31 in a counter-clockwise direction, the arm 31d continues to rotate the plate 79 counter-clockwise, causing the pin 107 to engage the cam edge 105 to cam the lever 95 back a little until the pin 107 passes the cam edge 105, whereupon the spring 97 pulls the detent lever 95 back to its extreme clockwise position, thereby trapping the pin 107 in the notch 103 between the left-hand side thereof and the edge of the toe or extension 87c on the lever 87. The pickup arm 61 is then locked against the movement radially inwardly of the turntable 13, since the lever arm 31d is in engagement with the pin 83. However, the pickup arm 61 is still free to move radially outwardly of the record and, as the actuating lever 31 continues its counter-clockwise movement, the pickup arm 61 is forced outwardly to its extreme outward position beyond the periphery of even the largest sized record on the turntable.

Figure 5:
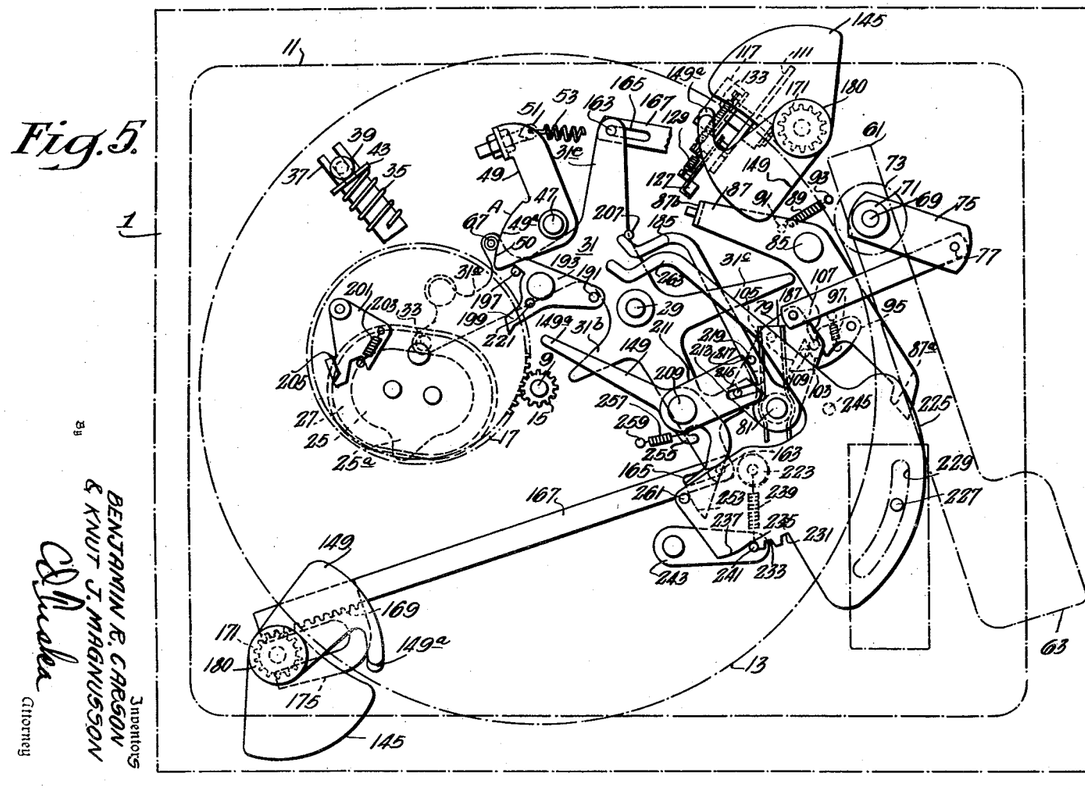
Figure 5 is a similar view showing the position of the parts approximately half way through the record changing cycle.
Figure 6:
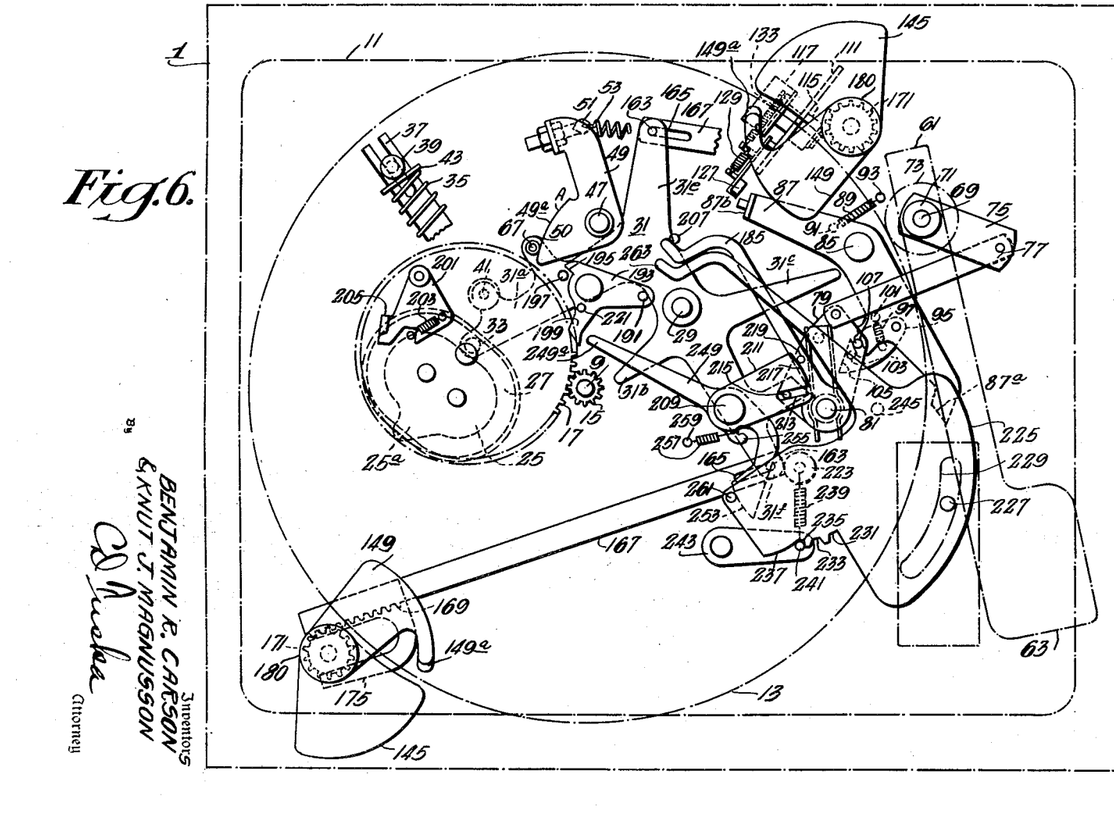
Figure 6 is a view similar to Fig. 4, but showing the position of the parts when a 12" record is released from the stack for dropping onto the turntable.

After the actuating lever 31 has reached the position shown in Fig. 5, the cam plate 25 becomes effective to return the lever 31 in a clockwise direction to its rest position. Since the spring 89 constantly pulls the lever 87 in a clockwise direction and the toe 87c is now in engagement with the pin 107, it is obvious that the lever 87 will turn the plate 79 in a counter-clockwise direction about its pivot 81 to cause the pin 83 to follow the lever arm 31d. Eventually, when the lever 87 is limited from further clockwise rotation by means shortly to be described, the lever arm 31d recedes from the pin 83, while the lever arm 31c approaches and finally engages the pin 109 to force the detent lever 95 counter-clockwise about its pivot, until the detent lever 95 is moved clear of the pin 107. The pickup arm 61 then becomes free to move over the record to reproduce the same, and the above described cycle is repeated when the needle eventually reaches the terminal groove of the new record.

Extending through a slot 110 in the plate 11 (Figs. 10 and 11) is a needle locating lever or post 111 having a cam edge 113 thereon and pivotally mounted for movement in a plane normal to that of the turntable 13 on a pin 115 carried by a bracket 117 which is secured to the plate 11. The post 111 is somewhat L-shaped and at the end of the shorter arm of the "L", it is formed with two arcuate steps 119 and 121. Pivotally mounted on the shorter arm of the post 111 on a pin 123 is a lever 125 which has an offset extension 127 at its free end, a spring 129 constantly biasing the lever 125 in a counter-clockwise direction and into engagement with a stop pin 131 on the post 111.

Figures 7, 10, 11:
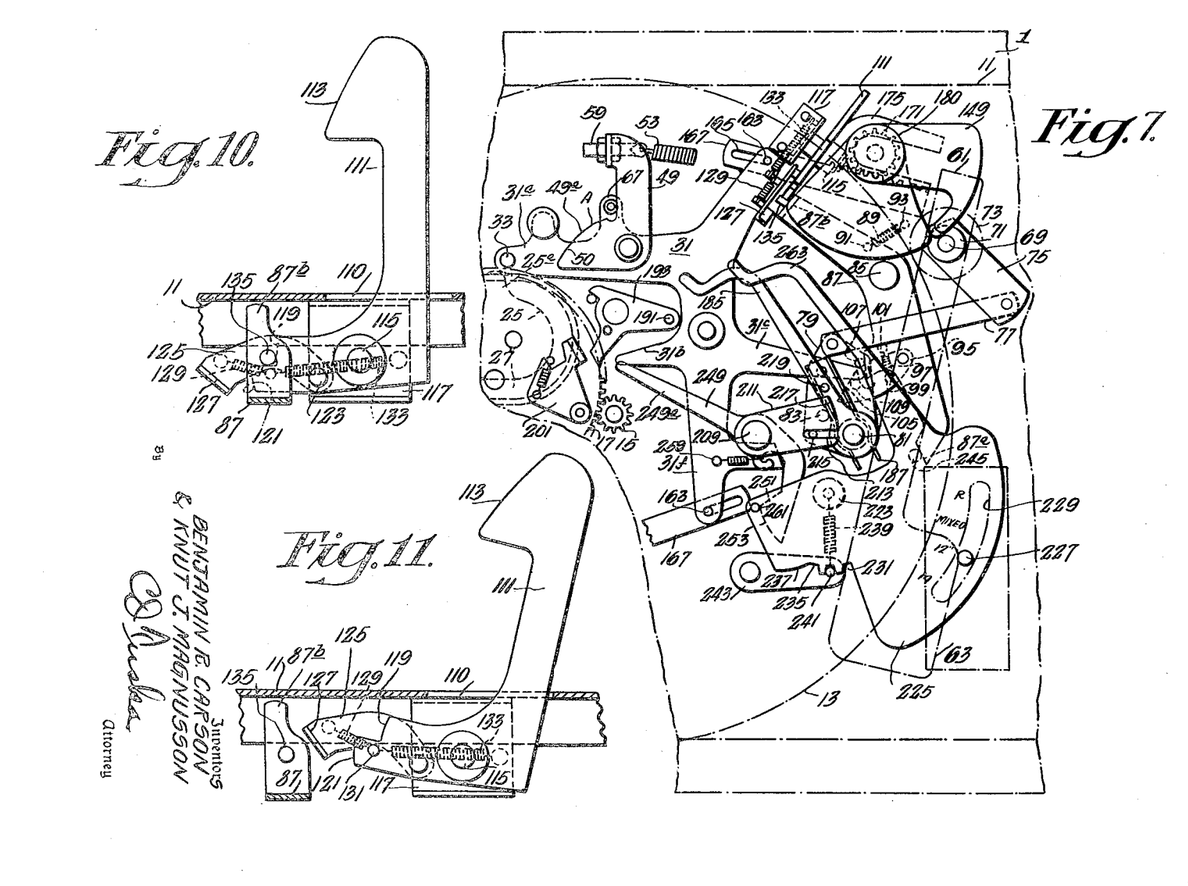
Figure 7 is a fragmentary view similar to Fig. 1, but showing the position of the parts at the start of a 12" record.
Figure 10 is an enlarged view showing, in a vertical section, the details of the mechanism for controlling the landing position of the needle with the parts in the 10" landing position.
Figure 11 is a similar view, but with the parts in the 12" landing position.

The post 111 is held in either the position shown in Fig. 10 or the position shown in Fig. 11 by means of an over-center spring 133 which is connected at one end to a pin 115a on the bracket 117 and at the other end to the pin 131. When the post 111 is in the position shown in Fig. 10, the cam edge 113 is external to the path of movement of a 10" record as it is transferred to the turntable in a manner presently to be described, but in this position, it lies in the path of movement of a 12" record. Now, if a 10" record is dropped down onto the turntable to be played next, the post 111 remains in the position shown in Fig. 10. During the first portion of the cycle, the lever 87 is moved counter-clockwise, as above described, and a pin 135 on the projection 87b thereof rides past the extension 127 without engaging the latter. Thereafter, upon clockwise movement of the lever 87, the lever 87 moves in this direction until the pin 135 engages the step 119, whereupon further clockwise movement of the lever 87 is prevented. Since, at this time, the pin 107 is locked between the left-hand edge of the U-notch 103 and the toe 87c, it is obvious that the pickup arm 61 will not move further in toward the spindle 9, and when it is subsequently lowered onto the record, it will land at the starting point of the 10" record.

Assume, now, that the dropped record is a 12" record. This record will engage the cam edge 113 on the post 111 and will force the post to the position shown in Fig. 11 as the record drops past it. The mechanism is so timed that the record is not released from the stack until after the lever extension 87b has reached the position shown in Fig. 11, where it is clear of the lever 125 and its extension 127. Upon subsequent clockwise movement of the lever 87, the pin 135 will strike the extension 127, lift the lever 125 against the action of the spring 129 sufficiently to pass under the extension 127, and eventually engage the step 121. Obviously, in such case, the lever 87 will not have moved as far clockwise as it did in connection with a 10" record, and consequently the pickup arm will not have been moved in toward the spindle 9 as far as previously. Thus, when the pickup is later lowered onto the 12" record, it will properly land at the starting groove thereof.

If the last played record is a 12" record and the succeeding record in the stack is a 10" record, it is obvious that it will be necessary to reset the locating post 111 from the position shown in Fig. 11 to the position shown in Fig. 10 so that, after the 10" record has dropped down onto the turntable, the pickup 63 will be properly located thereon. Just immediately prior to the release of the next succeeding record, the pin 135 strikes the lower end of the extension 127 on the lever 125 as the lever 87 moves in a counter-clockwise direction. Since the lever 125 is biased against the pin 131, the pin 135 will cam the extension 127 downwardly and thus effect counter-clockwise movement of the locating post 111 and the parts carried thereby. This action takes place until the pin 135 rides past the upper end of the extension 127, at which time the locating post 111 is in the position shown in Fig. 10. Thus, the mechanism is automatically set for the 10" starting position of the pickup. The action is the same whether the next record to be played is a 10" record or a 12" record. If the next succeeding record is a 10" record, the locating post 111 will remain in the position of Fig. 10. However, if the next record to be played is a 12" record, the latter will move the locating post 111 back to the position of Fig. 11 as it drops past it, and thus the proper starting point therefor will be obtained.

The records R are stacked vertically above the turntable upon a pair of supporting posts 137 (Figs. 12 to 15) located at diametrically opposite points with respect to the turntable 13, the posts 137 being rotatably received in bushings 139 fixed to the plate 11. Locked to the posts 137 by means of set screws 141 are hubs 143 to which are fixed and from which extend record supporting shelves 145 upon which the vertically stacked records are supported. The upper ends of the hubs 143 are formed hollow and loosely receive hubs 147 to which are secured record separators 149 displaced from the shelves 145 both circumferentially and axially with respect to the posts 137 and each being formed with a knife edge 149a terminating approximately adjacent the left-hand edge of the shelf 145, as viewed in Fig. 13. Pivotally supported on a downwardly extending lug 145a on each of the supporting shelves 145 is a lever 151 which carries a pin 153 extending loosely through an opening 155 in the hub 143. The pin 153 also has a reduced end which extends into an opening 157 in the hub 149, the opening 157 being of considerably larger diameter than the reduced end of the pin 153 and the pin 153 being in engagement with the upper portion of the opening 157, so that the hub 147 rests upon the pin. The supporting shelf 145 is formed with an opening 146 through which extends an adjustable, ball-tipped screw 159 threaded into the lever 151, the extent of projection of the ball tip of the screw 159 through the opening 146 being determined by a set screw 161 which is also threaded into the lever 151 and bears against the lower surface of the shelf 145. When the separators 149 are caused to rotate relative to the shelves 145, it is obvious that their hubs 147 will ride up on the pins 153 by virtue of the circular openings 157 therein, and thus the separators 149 will be raised slightly with respect to the supporting shelves 145. Also, by depressing the screws 159, the levers 151 will be moved in a clockwise direction, as viewed in Fig. 14, thereby also effecting an elevation of the separators 149 with respect to the shelves 145.

The oppositely extending arms 31e and 31f of the main actuating lever 31 carry pins 163 adjacent to their ends which are received in elongated slots 165 of a pair of slide bars 167. The slides 167 are formed with gear racks 169 which mesh with gears 171 formed on hubs 173, the hubs 173 being also formed with grooves which receive yoke members 175 secured to the slide bars 167 adjacent to their gear racks 169. The hubs 173 are formed with slots 177 at their upper ends for the reception of pins 179 extending through the posts 137. It will be obvious, therefore, that, upon rotation of the main actuating lever 31, the slide bars 167 will be moved first in one direction, and then in the opposite direction, to correspondingly rotate the gears 171 and the posts 137 with the parts carried thereby.

During initial counter-clockwise movement of the main actuating lever 31, and while the pickup is being raised from the record in the manner previously described, the pins 163 move in the slots 165 to take up the play afforded thereby and without any effect upon the slide bars 167. By the time the pickup has been raised from the played record and at approximately the time when the lever arm 31d engages the pin 83, the pins 163 have reached the opposite ends of the slots 165 and the record supporting posts begin to rotate. As the posts rotate, the record supporting shelves 145 begin to slide under the lowermost record of the stack and the record separators 149 move toward the record stack, the knife edges 149a thereof seeking to enter between the lowermost record and the next upper one. The separators 149 are so adjusted with respect to the shelves 145 that the knife edges 149a thereof will engage the edge of the lowermost record. When this happens, further rotation of the separators 149 is temporarily prevented, but since the pins 153 continue to rotate with the hubs 143 and the posts 137, the pins 153 will cam the separators 149 upwardly until the knife edges 149a are in a position to enter between the lowermost record of the stack and the next upper record, whereupon the separators 149 will slide in between the two lowermost records. Shortly thereafter, the trailing edges of the supporting shelves 145 (for example, the left-hand edge of the shelf 145b in Fig. 13) will clear the lowermost record, thereby freeing it to be dropped down along the spindle 9 which extends through the entire stack, and onto the previously played record on the turntable. If, as previously described, the released record is a 10" record, it will not strike the locating post 111 and the pickup will subsequently automatically come to rest at the starting position thereof. Eventually, when the main actuating lever 31 begins its clockwise rotation, its pins 163 will push the slide bars 167 back to the position shown in Fig. 1 and thereby return the posts 137 to their normal position, the separators 149 sliding away from under the then lowermost record so that the entire stack can drop down slightly onto the supporting shelves 145.

The screws 159 are so located with respect to the supporting shelves 145 that 10" records do not rest thereon. However, 12" records, which are usually thicker than 10" records, are of large enough diameter to engage the ball heads of the screws 159 and depress them. This causes the levers 151 to move in a clockwise direction, as viewed in Fig. 14, to thereby raise the separators 149 and thereby automatically compensate for the greater thickness of the 12" record next to be released. It will be noted, however, that the tops of the openings 157 in the hubs 147 still rest upon the pins 153 so that the action of the separators will still be the same as previously described when attempting to enter between the then lowermost 12" record and the next higher record, regardless of whether the latter record is a 12" record or a 10" record. Upon being released from the stack in the manner previously described, the then lowermost 12" record will strike the locating post 111 in its descent toward the turntable, and the starting position of the pickup thereon will again be automatically determined by the mechanism and in the manner previously set forth.

After the entire repertoire has been played, it is necessary to remove the accumulated records from the turntable. To make this possible, it is necessary to remove the supporting shelves 145 from their normal, record stack supporting position. To do this, it is merely necessary to raise the posts 137 until their pins 179 clear the slots 177 in the bushings 173 and turn the posts through an angle such that the shelves 145 will clear the 12" records, thereby permitting removal of the accumulated records. Before next operating the machine, it is, of course, necessary to reset the posts to the position shown in Fig. 12 with their pins 179 back in the slots 177.

The weight of each of the hubs 147 and the separators 149 is normally sufficient to insure engagement of the upper portion of the opening 157 with the pin 153 so that the action previously described will be insured. However, to further insure that this action will take place properly, a coil spring 181 may be placed around the upper end of the hub 147 and a C-washer or the like 183 secured to the upper end of the post 137. The spring 181 will then exert a force upon the hub 147 and thus press the latter against the pin 153. A cover 180, frictionally fitted onto the upper end of the hub 147, conceals the spring 181 and associated parts from view.

To effect the automatic cycle of operations heretofore described, there is provided a friction finger 185 fixed to a hub carried on the post 81. A spring member 187 which comprises a pair of substantially parallel arms embracing the hub of the friction finger 185 to frictionally grip the same is secured to the plate 79, the frictional force applied by the clutch spring 187 to the hub of the friction finger being adjustable by means of a screw 189 (Fig. 12), so that the friction finger 185 and the plate 79 may assume various angular positions with respect to each other. As the pickup arm 61 moves over the record and the plate 79 is moved in a counter-clockwise direction, it carries with it the friction finger 185, also in a counter-clockwise direction, until the free end of the finger 185 engages a pin 191 which extends through a cycle initiating pawl 193 pivoted to the under side of the plate 11 and restrained against free movement by a suitable leaf spring (not shown). The pin 191 extends down into the path of movement of the arm 31b of the actuating lever 31, a shoulder 195 on the pawl 193 being adapted to abut against a fixed pin 197 on the plate 11 to limit counter-clockwise rotation of the pawl 193. The pawl 193 is also formed with a forwardly extending arm 199 which terminates in a pair of angularly disposed faces that meet to form a knife edge.

Cooperating with the pawl 193 is a tripping member 201 pivoted on the upper face of the gear 17 eccentrically thereto and constantly urged in a clockwise direction by a spring 203. The tripping member 201 is provided with an upwardly extending trip 205 which terminates in a second knife edge adapted to cooperate with either of the faces of the knife edge of the arm 199, depending upon whether the knife edge of the tripping member 201 slips by the knife edge of the pawl 193 on the right or the left thereof, as viewed in Fig. 1.

When the free end of the friction finger 185 engages the pin 191 of the pawl 193, it imparts a clockwise rotation to the cycle initiating pawl 193 tending to bring its knife edge into line with the knife edge of the tripping member 201 as the tripping member rotates with the continuously rotating gear 17. During the time that the needle 65 is in engagement with the sound groove of a record, its forward advance across the record at each revolution thereof is so slight that the pickup arm 61 causes the plate 79 and the friction finger 185 to advance the pawl 193 a distance insufficient to dispose the right-hand face of its knife edge (as viewed in Fig. 1) in the path of the knife edge of the tripping member 201. The latter knife edge will, therefore, pass to the left of the knife edge of the pawl 193 and the outer face of the trip 205 will engage the adjacent face of the arm 199 to cam the pawl 193 back slightly in a counter-clockwise direction, this being permitted by the plate 79 since it is only frictionally coupled to the finger 185. Thus, the angle between the plate 79 and the friction finger 185 is gradually reduced.

The foregoing action takes place continuously until the needle 65 enters the terminal groove of the record, whereupon the pickup arm is advanced a greater distance in one revolution of the record than while the needle was in engagement with the sound groove. The pawl 193 is, therefore, also advanced a greater distance than normally and, in fact, is advanced to a point where the knife edge of the tripping member 201 passes to the right of the knife edge on the pawl 193 on the next revolution of the gear 17. When this occurs, a further quick and somewhat sudden clockwise rotation is imparted to the pawl 193 whereupon the downwardly extending portion of its pin 191 will engage the lever arm 31b to rotate the actuating lever 31 in an initial counter-clockwise direction to initiate a cycle of automatic operations. As a result of this initial counter-clockwise movement of the lever 31, the cam follower 33 will be forced into the cam track 27 through the opening 23, and the automatic cycle of operations previously described will take place.

Before the next record is played, it is necessary to reset the friction finger 185 with respect to the plate 79. For this purpose, a stop pin 207 is provided on the plate 11 against which the free end of the friction finger 185 abuts when it is moved in a clockwise direction by the plate 79 in response to actuation of the latter by the arm 31d of the actuating lever. Pivotally mounted on a post 209 on the plate 11 is a trip regulating plate 211 having a slot 213 therein for the reception of a pin 215 on the plate 79. As the plate 79 turns clockwise in response to the lever arm 31d, the pin 215 forces the plate 211 around in a counter-clockwise direction to bring the edge 217 thereof against a pin 219 on the friction finger 185. The friction finger 185 thus becomes locked against movement in either direction. When the plate 79 is later returned in a counter-clockwise direction, its pin 215, acting in the slot 213, rotates the regulating plate 211 in a clockwise direction until its edge 217 is moved away from the pin 219. Thereupon, the friction finger 185 moves with the plate 79, having been preset to the required relation therewith. Continued movement of the pickup arm over the record subsequently brings the friction finger into engagement with the pin 191 of the pawl 193 and the previously described action takes place. However, the pawl 193 must first also be reset, and this is accomplished by engagement of the arm 31a of the actuating lever with a pin 221 on the pawl 193 to rotate the latter in a counter-clockwise direction as the actuating lever 31 goes through the first half of the cycle.

Figure 1:
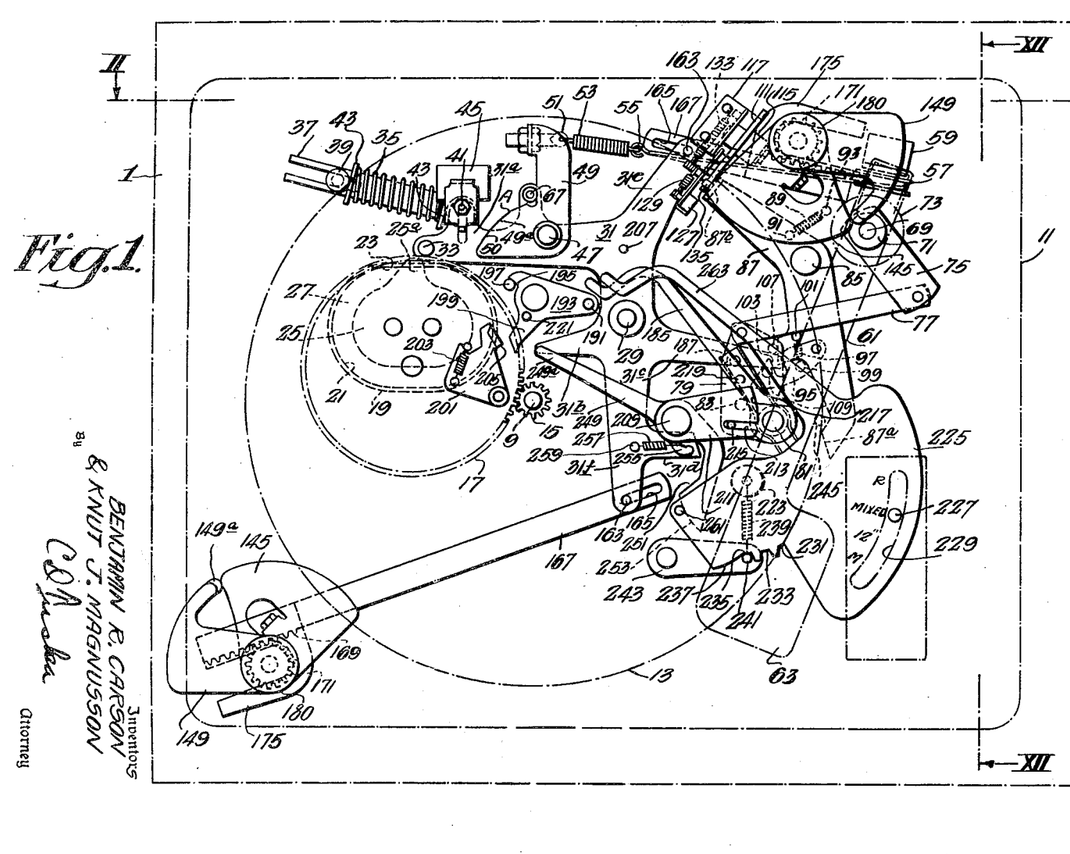
Figure 1 is a plan view of our improved phonograph set to play 10" records automatically and with the parts in the position at the beginning of playing of a record, certain portions of the phonograph being shown in outline for the sake of clearness.
Figure 2:
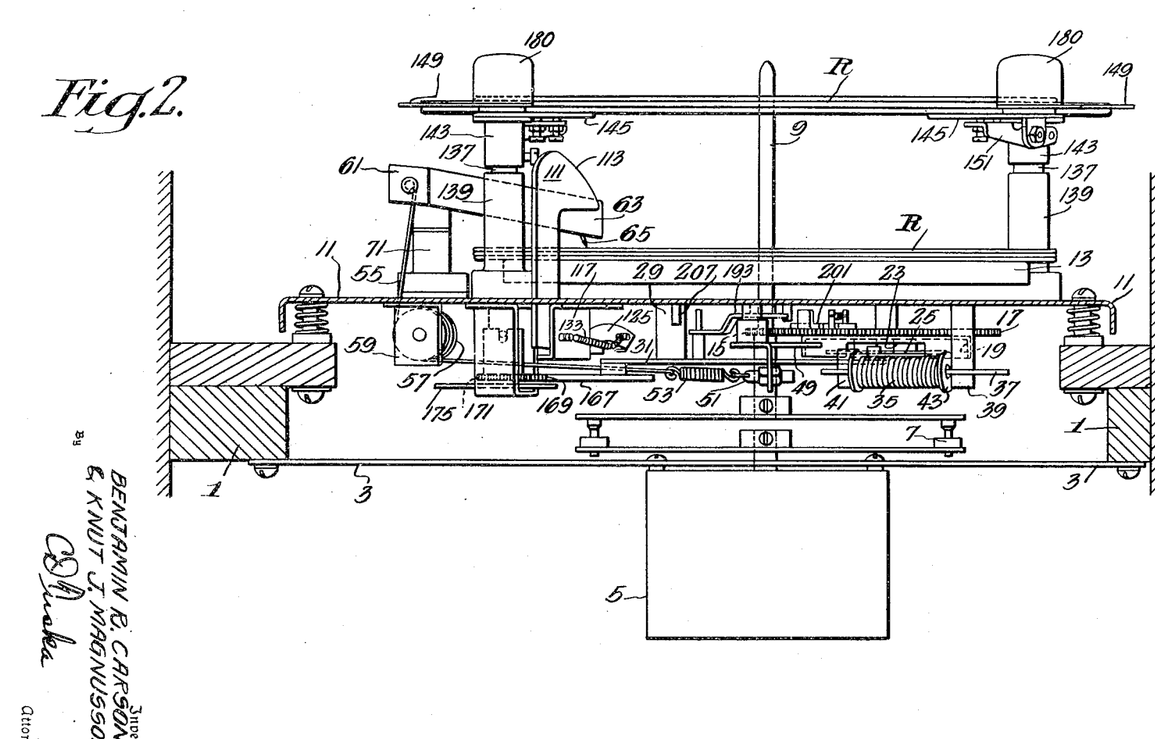
Figure 2 is a sectional view taken along the plane of the line II—II in Fig. 1 and looking in the direction of the appended arrows, the portions of the phonograph which are shown in outline in Fig. 1 being here shown in full lines to more clearly indicate the relation of the various parts, and certain of the parts of Fig. 1 being omitted for the sake of clearness.

Pivotally mounted on a post 223 on the plate 11 is an index plate 225 which has an upstanding pin 227 constituting a handle by which the index plate may be manipulated and which extends through an arcuate slot 229 in the plate 11. By means of the index plate 225, the machine may be set (1) to automatically play either 10″ records alone or 10″ and 12″ records mixed indiscriminately, (2) to automatically play 12″ records alone, (3) to play one record at a time, any size up to 12″, manually, or (4) to reject any record without having to wait for it to be played. For this purpose, the index plate 225 is provided with three notches 231, 233, and 235 and with a cam edge 237, a coil spring 239 which has one end fixed to the pivot post 223 and its other end fixed to a pin 241 on a pivoted lever 243 serving to hold the index plate in any position to which it is set manually by drawing the pin 241 into one or the other of the notches 231, 233 or 235. When the index plate 225 is set in the position marked "Mixed," as shown in Fig. 1, the pin 241 is engaged in the notch 235, and a pin 245 on the index plate 225 is in a position such that it is spaced from the toe 87a of the lever 87. This leaves the lever 87 free to act as above described to permit locating the pickup arm on either a 10″ record or a 12″ record by engagement of its pin 135 with either the step 119 or the step 121, as above described.

If 10″ records alone are stacked on the turntable, it is obvious that they will be played automatically in succession as above described by merely setting the index plate 225 to the "Mixed" position. Similarly, if the records of the stack are mixed, this position of the index plate will likewise permit playing of the mixed records in appropriate manner. Since, however, the locating post 111 is always automatically reset for locating the pickup arm in the 10" position, it is clear that, after the last record of the stack is played, it will be repeated from the 10" position. Thus, if the last record is a 12" record, it will not be repeated from the beginning. It is to insure the last record being repeated from the beginning that the notch 233 is provided, so that where the records in the stack are all 12" records, they will all be played from the 12" position, and the last record will itself be repeated from the very beginning.

When the index plate is moved to the "12 inch" position, as shown in Fig. 7, the pin 241 is drawn into the notch 233 by the spring 239 to hold the index plate in this position, and the pin 245 is brought into the path of the toe 87a. Consequently, when the lever 87 goes through the cycle above described, the toe 87a eventually engages the pin 245 which prevents further clockwise movement of the lever 87 and automatically sets it to return the pickup to the 12" starting position.

Figure 8:
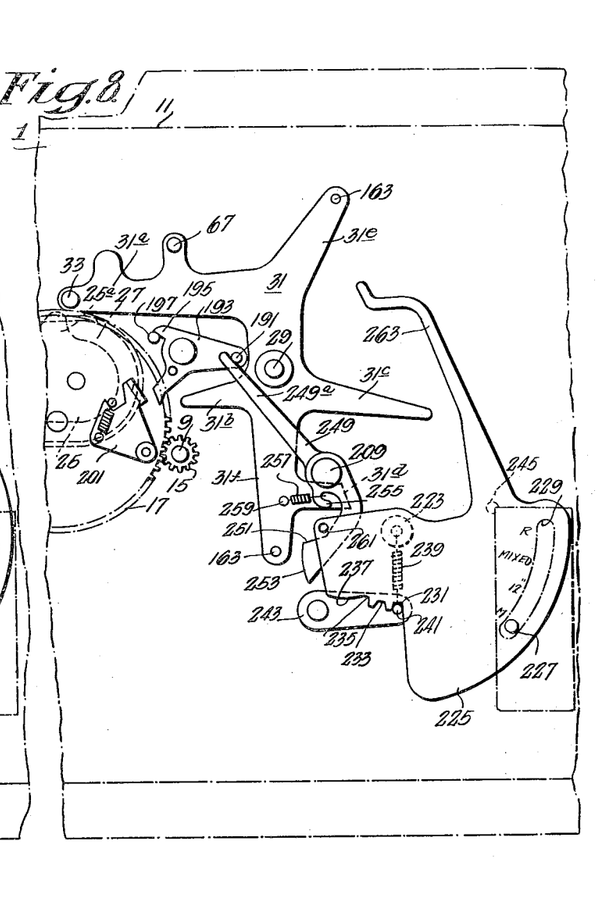
Figure 8 is a fragmentary detail view showing the position of certain parts when the mechanism is set for manual operation.

For playing individual records of any diameter up to 12" manually, the index plate 225 is moved to the manual position indicated by the mark "M," as shown in Fig. 8. In this position, the pin 241 is drawn into the notch 231 by the spring 239, whereby the plate 225 is releasably locked in the desired position. When the machine is adjusted for manual playing, it is necessary that the trip pawl 193 be rendered inoperative. For this purpose, there is pivoted on the post 209 a lever 249 formed adjacent one end with a cam edge 251 which terminates in an arcuate end 253, the lever 249 being also provided with a hook 255. A coil spring 257 which has one end fixed to a pin 259 on the plate 11 and its other end secured to the hook 255 constantly biases the lever 249 in a clockwise direction and tends to move it into the position shown in Fig. 8, but it is prevented from doing so normally by a pin 261 on the index plate 225 which, in any other than manual position of the plate 225, is in engagement with the arcuate end 253. When, however, the index plate 225 is moved to the manual position shown in Fig. 8, the clockwise rotation of the index plate 225 carries the pin 261 beyond the end 253 and past the cam edge 251 into the position shown in Fig. 8, whereupon the spring 257 becomes free to move the lever 249 into the position of Fig. 8. In this position, the finger 249a of the lever 249 engages the pin 191 of the pawl 193 and positively holds it in a position such that the knife edge on the pawl 193 is entirely clear of the knife edge on the tripping member 201. Hence, the cycle initiating mechanism cannot become effective to initiate a cycle of automatic operations, and the machine will continue to play records one at a time manually, the needle 65 riding in the terminal groove of each record until manually removed therefrom.

Figure 9:
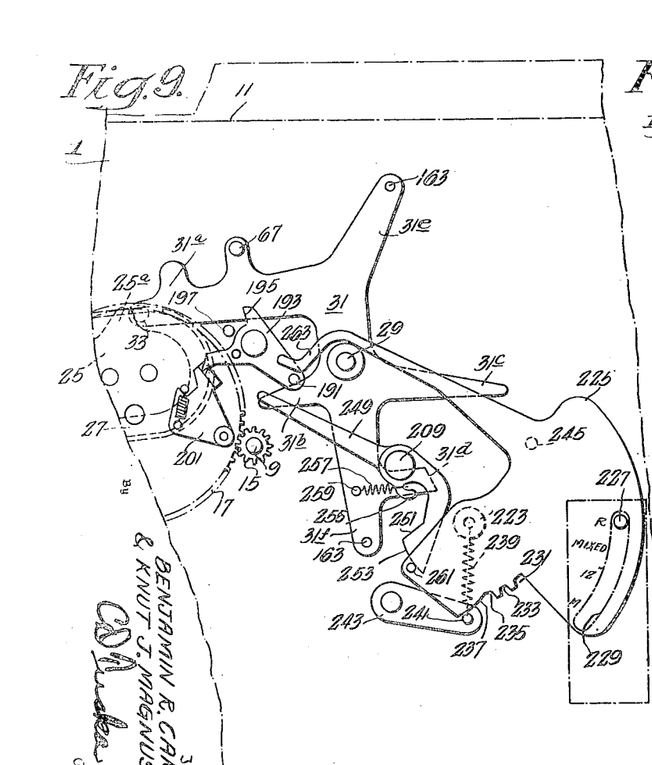
Figure 9 is a similar view, but showing the position of the parts when they have been moved to reject position.

For rejecting any record, the index plate 225 may be moved to the position marked "R," as shown in Fig. 9. When moved to this position, the cam edge 237 of the index plate acts against the pin 241, thereby expanding the spring 239, so that the latter will automatically return the pin 241 into the notch 235 as soon as the handle 227 is released. When the plate 225 is moved manually to the position shown in Fig. 9, a finger 263 extending from the plate 225 is brought into engagement with the pin 191 on the pawl 193 to move the pawl clockwise far enough to bring its knife edge slightly beyond the path of the knife edge on the tripping member 201. Accordingly, the tripping member 201 will strike the pawl 193 to bring the pin 191 against the lever arm 31b and thus initiate a cycle of automatic operations in the manner heretofore described.

Although we have shown and described our invention in considerable detail, it will be obvious to those skilled in the art that many variations thereof and changes in the particular embodiment disclosed are possible. We, therefore, desire that the foregoing shall be considered merely as illustrative and not as limiting.

We claim as our invention:

1. In an automatic phonograph, the combination of a turntable, means for supporting a vertical stack of records of different diameters above said turntable and for normally restraining movement of said stack toward said turntable, means for effecting release of successive lowermost records of said stack irrespective of the diameter thereof for transference thereof to said turntable, a sound reproducing device, and means for controlling the landing position of said sound reproducing device on each successively transferred record; said last means including a first pivoted member normally disposed in the path of movement of a large diameter record but clear of the path of movement of a small diameter record during transference thereof whereby said small diameter records are ineffective to actuate said first pivoted member, said first pivoted member including a pair of stops, one stop corresponding to small diameter records and the other stop corresponding to large diameter records, means responsive to said first pivoted member comprising a second pivoted member coactive with said sound reproducing device and including an element for cooperation with one or the other of said stops, said first pivoted member being actuable only by a large diameter record during its transference to render said second pivoted member effective to locate said sound reproducing device at the beginning of only a large diameter record.

2. In an automatic phonograph, the combination of a turntable, means for supporting a vertical stack of records of different diameters above said turntable and for normally restraining movement of said stack toward said turntable, means for effecting release of successive lowermost records of said stack irrespective of the diameter thereof for transference thereof to said turntable, a sound reproducing device, and means for controlling the landing position of said sound reproducing device on each successively transferred record; last said means including a first pivoted member normally disposed in the path of movement of a small diameter record during transference thereof whereby said small diameter records are ineffective to actuate said member, said pivoted member including a pair of stops, one stop corresponding to small diameter records and the other stop corresponding to large diameter records, means responsive to said first pivoted member comprising a second pivoted member coactive with said sound reproducing device and including an element for coaction with one of said stops to normally locate said sound reproducing device at the beginning of a small diameter record, said first pivoted member being actuable by a large diameter record during its transference to engage said element of said second pivoted member with the other of said stops to locate said sound reproducing device at the beginning of said large diameter record, and preset operable means coactive with said second pivoted member for rendering said pivoted member effective to successively automatically locate said sound reproducing device at the beginning of only large diameter records.

BENJAMIN R. CARSON.
KNUT J. MAGNUSSON.

REFERENCES CITED

The following references are of record in the file of this patent:

UNITED STATES PATENTS

| Number | Name | Date |
|---|---|---|
| 1,968,927 | Buckle | Aug. 7, 1934 |
| 2,017,898 | Gates | Oct. 22, 1935 |
| 2,286,490 | Knox | June 16, 1942 |

FOREIGN PATENTS

| Number | Country | Date |
|---|---|---|
| 452,415 | Germany | Nov. 10, 1927 |
| 510,949 | Germany | Oct. 24, 1930 |